Nov. 17, 1959   C. F. BEAURLINE   2,913,234
AIR LINE LUBRICATOR
Filed April 26, 1956
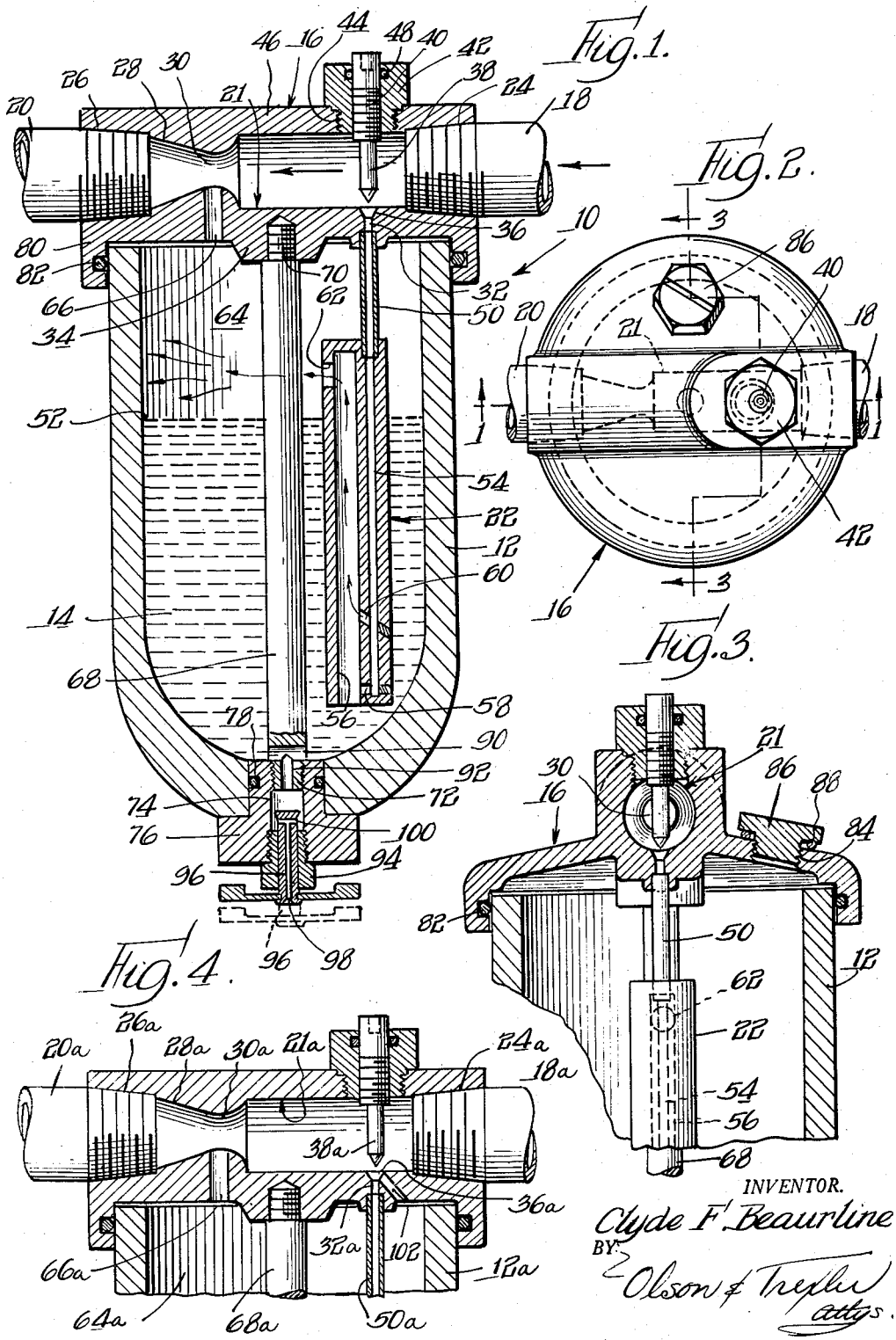
INVENTOR.
Clyde F. Beaurline
BY Olson & Trexler
attys.

United States Patent Office
2,913,234
Patented Nov. 17, 1959

2,913,234
AIR LINE LUBRICATOR

Clyde F. Beaurline, Downers Grove, Ill., assignor to Hills McCanna Company, Chicago, Ill., a corporation of Illinois Application April 26, 1956, Serial No. 580,848

1 Claim. (Cl. 261—78)

The present invention relates to a novel lubricator, and more particularly to a novel lubricator of the type adapted to provide atomized lubricant in an air line.

Various apparatus and machinery which are operated pneumatically are lubricated by atomized oil or the like carried by the actuating air flowing through an air line to the machinery. A number of devices have been proposed for introducing atomized lubricant into an air line, which devices are connected directly in the air line. While certain of the heretofore suggested lubricating devices have been generally satisfactory, many of them have had one or more disadvantages. For example, certain heretofore proposed devices are relatively complicated and expensive to manufacture, certain devices tend to introduce relatively large droplets of oil slugs into the air line, which slugs might cause injury to the machinery, and certain heretofore proposed devices create an undesirable large pressure drop in the air line.

An object of the present invention is to provide a novel lubricator adapted to introduce atomized lubricant into an air line, which lubricator is of relatively simple construction so that it may be economically produced and so that it requires a minimum of maintenance.

A further object of the present invention is to provide a novel lubricator of the above described type which is constructed so as to eliminate any possibility of oil slugs being introduced into the air line, whereby the lubricator is especially suitable for installations wherein intermittent or short bursts of air flow are contemplated.

A further object of the present invention is to provide a novel lubricator of the above described type which is constructed so as to minimize any air pressure drop in the air line.

A more specific object of the present invention is to provide a novel lubricator of the type set forth in the preceding paragraphs which is constructed so as to promote rapid and uniform distribution of atomized lubricant throughout the air flowing through the air line.

Another more specific object of the present invention is to provide a novel lubricator of the above described type which is constructed so that an operator may easily visually inspect the device to determine whether or not it is operating properly.

Other objects and advantages of the present invention will become apparent from the following description and the accompanying drawings wherein:

Fig. 1 is an enlarged cross sectional view taken along line 1—1 of Fig. 2 and showing a lubricator incorporating the features of the present invention;

Fig. 2 is a plan view of the lubricator of this invention;

Fig. 3 is a fragmentary sectional view taken along line 3—3 in Fig. 2; and

Fig. 4 is a fragmentary sectional view similar to Fig. 1 but showing a modified form of the present invention.

Referring now more specifically to the drawings wherein like parts are designated by the same numerals throughout the various figures, a lubricator 10 incorporating the features of the present invention includes, in general, a bowl 12 adapted to contain a body of oil or other lubricant 14, a cap or head member 16 closing the open upper end of the bowl or receptacle and adapted to be connected between sections 18 and 20 of an air line, and a lubricant atomizing device 22 disposed within the receptacle.

The head member 16 is formed with a main gas or air passageway 21 which has an inlet 24 connectable with the pipe section 18 and an outlet 26 connectable with the pipe section 20. Intermediate the inlet and outlet, the passageway 21 is formed with a Venturi section 28 so that a relatively high velocity low pressure flow of air will be established at the throat 30 of the Venturi while at the same time minimizing the overall air pressure drop between the inlet 24 and the outlet 26.

Lubricant atomizing air is applied to the atomizing device through a relatively small diameter passageway or aperture 32 formed in a lower wall portion 34 of the head member and communicating with the passageway 21. The tapered seat 36 is formed at the inlet end of the passageway 32 for cooperation with a needle valve 38 to control the flow of air to the atomizing device. The needle valve is made integral with or is secured to a screw member 40 which is adjustably mounted in an internally threaded plug 42 threaded into a tapped aperture 44 in an upper wall portion 46 of the head member. An O-ring or the like 48 is provided in the plug member around an upper smooth end portion of the screw member for sealing purposes.

A tube 50 is connected with the lower wall portion 34 of the head member in communication with the passageway 32, and the tube is also connected to and supports the atomizing device 22. The atomizing device comprises an elongated upstanding member which extends from a position above a maximum lubricant level 52 in the receptacle to a position adjacent the bottom of the receptacle. As shown in the drawings, the device 22 is preferably and conveniently made in the shape of an elongated cylindrical member and is provided with a longitudinally extending relatively small diameter passageway 54 which communicates with the tube 50 and has a closed bottom end. The device 22 is also provided with a relatively large diameter passageway 56 extending longitudinally therein and having a lower end in open communication with the bottom portion of the receptacle and a closed upper end. Substantially at the lower end of the device 22 a small generally horizontal aperture 58 is provided between the passageways 54 and 56 for directing air from the passageway 54 substantially at right angles to the longitudinal axis of the passageway 56. Another aperture 60 is provided between the upstanding passageways in a lower portion of the device 22 but above the aperture 58, and the aperture 60 is inclined from the horizontal for directing air upwardly into the passageway 56. The combined cross section area of the apertures 58 and 60 is not substantially greater than the cross sectional area of the inlet passageway 54. The device 22 is provided with an outlet aperture 62 in a side thereof and communicating with the passageway 56 adjacent its upper end.

The lubricator thus far described functions in the following manner. A main flow of air or gas passes through the passageway 21 so that a relatively high pressure is established in the inlet portion of the passageway and a relatively low pressure is established in the throat of the Venturi section. Furthermore, a substantial pressure drop is obtained between the inlet 24 and a chamber 64 in the upper end of the receptacle, which chamber communicates with the throat of the Venturi section by a passageway 66 formed in the head member. It has been found that a ratio of about 5.5 to 1 should be maintained between the cross sectional areas of the passageway 21 and the Venturi throat. This ratio provides for the best combination of pressure drop and flow rates between the various areas of the lubricator to obtain desired lubricant droplet classification described below. A relatively small portion of the air or gas is bled from the main gas passageway through the passageway 32, the tube 50 and the inlet passageway 54 of the atomizing device. The air or gas entering the passageway 56 through the apertures 58 and 60 lifts the lubricant or oil from the lower end of the receptacle and atomizes the lubricant as the air and lubricant emerge from the aperture 62 and into the chamber 64. It should be noted, that the air directed generally horizontally from the aperture 58 agitates and mixes with oil or lubricant entering the lower end of the passageway 56, and the air flowing from the aperture 60 further agitates and mixes with the oil and also serves to direct the oil and air mixture upwardly. Thus, the lubricant or oil within the passageway 56, rather than being in the form of a solid column, is partially broken up and mixed with the air so as to promote more efficient atomization of the lubricant as it emerges from the aperture 62.

As shown in the drawings, the atomized lubricant flowing from the aperture 62 is directed generally horizontally so that any relatively large drops or slugs of lubricant will impinge against either a receptacle connecting rod 68 or the wall of the receptacle and be reclassified or, in other words, will drain back into the body of lubricant within the receptacle. The lighter and properly atomized portions of the lubricant will float within the chamber 64 and will subsequently be drawn through the passageway 66 and into the throat portion 30 of the Venturi section 28. It should be noted, that uniform distribution of the atomized lubricant throughout the air in the main air line is promoted by introducing the atomized lubricant into the high velocity low pressure and constricted air flow provided at the Venturi throat. As will be understood, the amount of air flowing to the atomizing device, and therefore the amount or rate of lubricant atomization and the richness of the ultimate air and lubricant mixture in the air line may be controlled by adjusting the needle valve 38 to open or restrict the passageway 32.

The receptacle 12 and the atomizing device 22 are both preferably made from a transparent material such as clear plastic. This enables an operator to observe the atomizing action taking place within the receptacle and thereby assure himself that atomized lubricant is being supplied to the air line. The receptacle is removably and floatingly connected to the head member by means including the above mentioned tie rod 68 which has an upper threaded end portion 70 turned into a threaded aperture in the head member and a lower threaded end portion 72 turned into an aperture 74 in a plug or nut member 76 fitting within an aperture in the bottom of the receptacle. An O-ring or the like 78 is mounted in a suitable groove in the shank portion of the plug member 76 for sealing the bottom opening in the receptacle, and a depending annular flange 80 extends from the head member around the upper end of the receptacle and has an O-ring or the like 82 mounted therein for sealing the upper end of the receptacle.

When assembling the receptacle or bowl with the head member, the center bolt 68 is first screwed into the head member and the O-ring 82 is placed in its cavity in the flange 80. Then the bowl 12 is carefully assembled past the O-ring 82 until it nests substantially fully within the flange 80 and the previously assembled retainer plug or nut 76 and valve means together with the O-ring 78, is pushed through the opening in the lower end of the bowl. Then the retainer nut is turned onto the threads of the reduced diameter bolt and sections 72 until the end of the retainer nut abuts the larger diameter portion of the center bowl.

The manufacturing tolerances of the bolt 68, the flange 80 and the nut or plug member 76 are such that after the assembly is completed there is free perpendicular play of the bowl 12, which play may, for example, be on the order of 1/32 (one thirty-second) of an inch. This enables the receptacle or bowl 12 to float and to rotate freely relative to the head member and the nut or plug member 76 while at the same time the bowl is effectively sealed in a substantially airtight and oiltight manner by the O-rings 82 and 78. It will be appreciated that with this arrangement the bowl may be easily assembled with or removed from the head member and that the manufacturing tolerances may be such as to promote more economical production of the unit.

A filling aperture 84 is provided in the cap or head member to permit filling of the receptacle with the lubricant without removing the receptacle from the head member, and this opening is normally closed and sealed by a plug member 86 and a sealing ring 88. Means is also provided to permit draining of the receptacle, which means includes a transverse passageway 90 formed within the rod 68 substantially at the bottom of the receptacle and a passageway 92 which establishes communication between the passageway 90 and the aperture 74 in the plug member 76. An apertured bushing 94 is inserted in the lower end of the aperture 74, and a threaded valve member 96 extends through the bushing 94. The valve member has a longitudinally extending passageway 98 which intersects a cross passageway 100 adjacent to but spaced from its inner end so that when the valve member is turned to the broken line position shown in Fig. 1, the passageway 100 is sealed within the bushing 94 and the lubricant is prevented from draining from the receptacle.

Fig. 4 shows a modified form of the present invention which is similar to the above described structure as indicated by the application of identical reference numerals with the suffix "a" added to corresponding elements. This embodiment differs in that a secondary aperture or passageway 102 is provided between the main gas or air passageway 21a and the chamber 64a in the upper portion of the receptacle. Preferably the secondary passageway 102 communicates with the needle valve seat 36a so that air flowing therethrough may also be controlled by the needle valve. This modified structure provides for an increased and tangential air flow through the chamber so that a larger proportion of and larger particles of the atomized lubricant are swept from the chamber 64a, through the outlet passageway 66a and into the main gas or air stream. In other words, this greater air flow sweeps out more of the heterogeneous sizes of atomized particles, and reduces the settling action which takes place when the passageway 102 is omitted. Thus, a richer air lubricant mixture is obtained.

While the preferred embodiments of the present invention have been shown and described herein, it is obvious that many structural details may be changed without departing from the spirit and scope of the appended claim.

The invention is claimed as follows:

An apparatus for introducing atomized liquid into a gas stream, and comprising means providing a main gas passageway including restriction means for establishing a relatively low pressure high velocity gas flow in one section of the main gas passageway, means providing an atomizing gas circuit including an inlet conduit communicating with said main gas passageway upstream from said main gas passageway section and an upstanding elongated member having a relatively small gas passageway extending downwardly from a connection with said conduit at the upper end of said member and terminating in a closed end short of the lower end of said member, said elongated member further including a relatively large combined liquid and gas passageway open at the lower end of said member for immersion in a supply of liquid and having an outlet port above the liquid supply through which both liquid and gas emerge for atomizing the liquid, a first gas inlet opening above the open lower end of said combined liquid and gas passageway affording communication between the relatively small gas passageway and the combined liquid and gas passageway and disposed for directing gas into the combined liquid and gas passageway substantially perpendicularly to the axis thereof for agitating and mixing with the liquid therein, a second gas inlet opening disposed above said first gas inlet opening and affording communication between the relatively small gas passageway and the combined liquid and gas passageway and inclined toward the said outlet port for directing gas into the combined liquid and gas passageway in a direction toward said outlet port and serving to direct the liquid and gas mixture upwardly toward said outlet port, and means surrounding said outlet port and communicating with said main gas passageway section for confining the atomized liquid and directing the atomized liquid into the main gas passageway section.

References Cited in the file of this patent

UNITED STATES PATENTS

| | | |
|---|---|---|
| 1,438,926 | Leet | Dec. 12, 1922 |
| 1,441,277 | Haas | Jan. 9, 1923 |
| 2,187,241 | Kehle | Jan. 16, 1940 |
| 2,205,559 | Heftler | June 25, 1940 |
| 2,215,699 | Heftler | Sept. 24, 1940 |
| 2,367,721 | Gothberg et al. | Jan. 23, 1945 |
| 2,542,701 | Press | Feb. 10, 1951 |
| 2,564,938 | Warren | Aug. 21, 1951 |
| 2,682,393 | Norgren | June 29, 1954 |
| 2,710,672 | Costes | June 14, 1955 |